United States Patent
Faisant

[19]

[11] Patent Number: 6,105,746
[45] Date of Patent: Aug. 22, 2000

[54] RAIL WITH ROLLERS AND PROCESS OF MANUFACTURE

[75] Inventor: Gilles Faisant, Les Sables d'Olonne, France

[73] Assignee: Sipa Roller, La Roche sur Yon Cedex, France

[21] Appl. No.: 09/308,645

[22] PCT Filed: Nov. 27, 1997

[86] PCT No.: PCT/FR97/02141

§ 371 Date: Jul. 29, 1999

§ 102(e) Date: Jul. 29, 1999

[87] PCT Pub. No.: WO98/23508

PCT Pub. Date: Jun. 4, 1998

[30] Foreign Application Priority Data

Nov. 28, 1996 [FR] France .................................. 96 14838

[51] Int. Cl.$^7$ ................................................ B65G 13/00
[52] U.S. Cl. ........................................................ 193/35 R
[58] Field of Search ................................ 193/35 R, 37, 193/35 B

[56] References Cited

U.S. PATENT DOCUMENTS

| | | | |
|---|---|---|---|
| 2,172,380 | 9/1939 | Harris | 193/35 R |
| 3,586,142 | 6/1971 | Inwood et al. | 193/35 R |
| 3,744,610 | 7/1973 | Tables | 193/35 R |
| 3,915,275 | 10/1975 | Specht | 193/35 R |
| 4,186,830 | 2/1980 | Corey et al. | 193/35 R |

FOREIGN PATENT DOCUMENTS

| | | |
|---|---|---|
| 2563506 | 10/1985 | France . |
| 1208687 | 1/1966 | Germany . |
| 2844229 | 4/1980 | Germany . |
| 3346818 | 7/1985 | Germany . |
| 3724097 | 2/1989 | Germany . |

*Primary Examiner*—James R. Bidwell
*Attorney, Agent, or Firm*—Greenblum & Bernstein, P.L.C.

[57] ABSTRACT

Roller rail comprising a lower profile whose section is one of, U-shaped or omega-shaped, a plurality of rollers, and an upper profile made of a steel band, cut and embossed, used as a roller carrier. The band comprises edges which are folded and crimped on upper rims of the lower profile, which edges are linked together by crossbeams between which the rollers are positioned. The process of manufacture of a roller rail comprises preparing by, one of, folding or profiling operations, a sheet metal band, a lower profile with one of, U-shaped or omega-shaped section, and an upper profile carrying a plurality of rollers and assembling the profiles together by folding and crimping the edges of the sheet metal band constituting the upper profile onto upper rims of the lower profile.

14 Claims, 4 Drawing Sheets

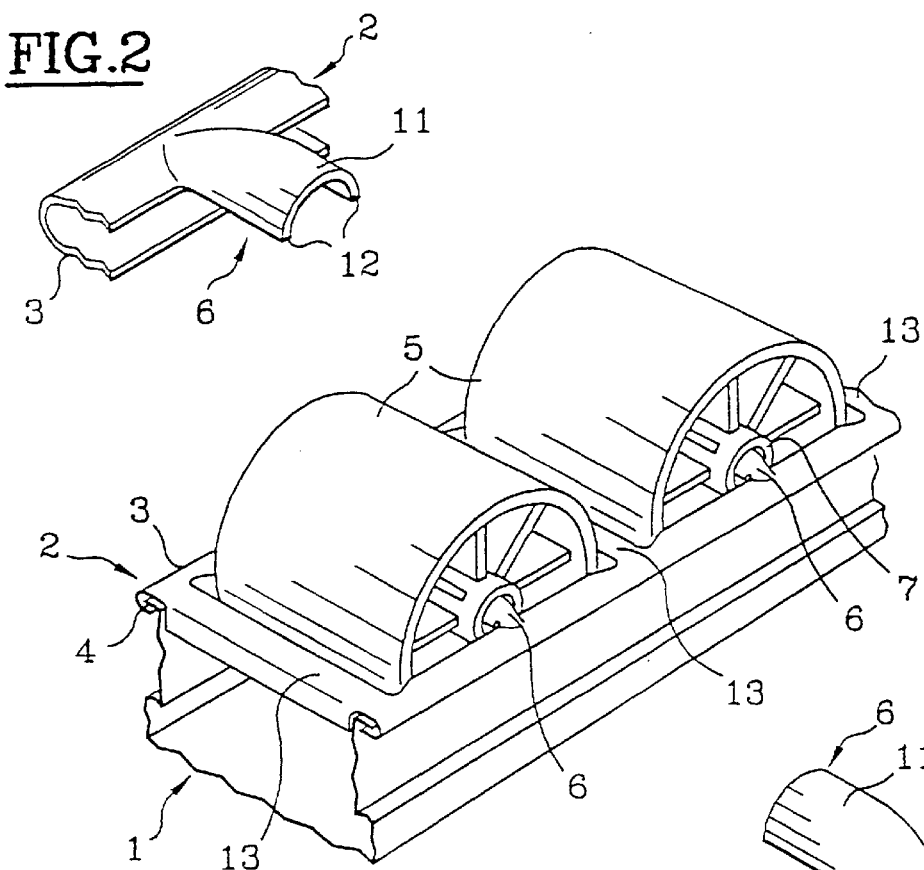
FIG.2
FIG.1
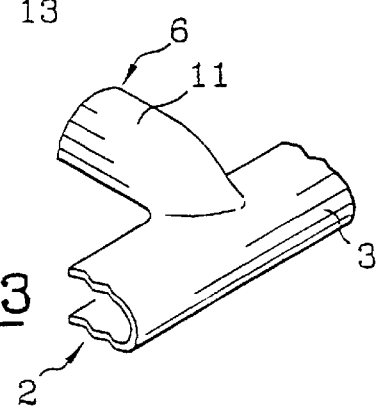
FIG.3
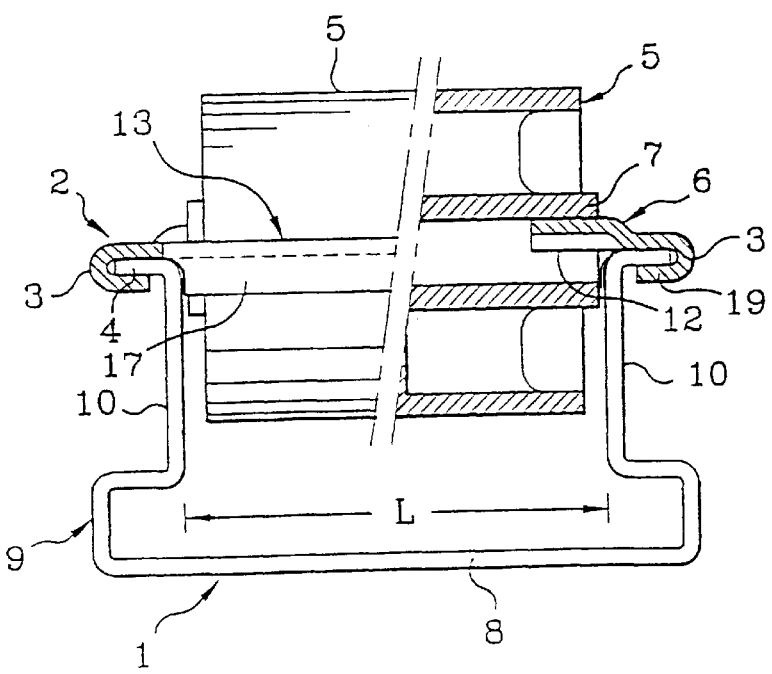
FIG.4

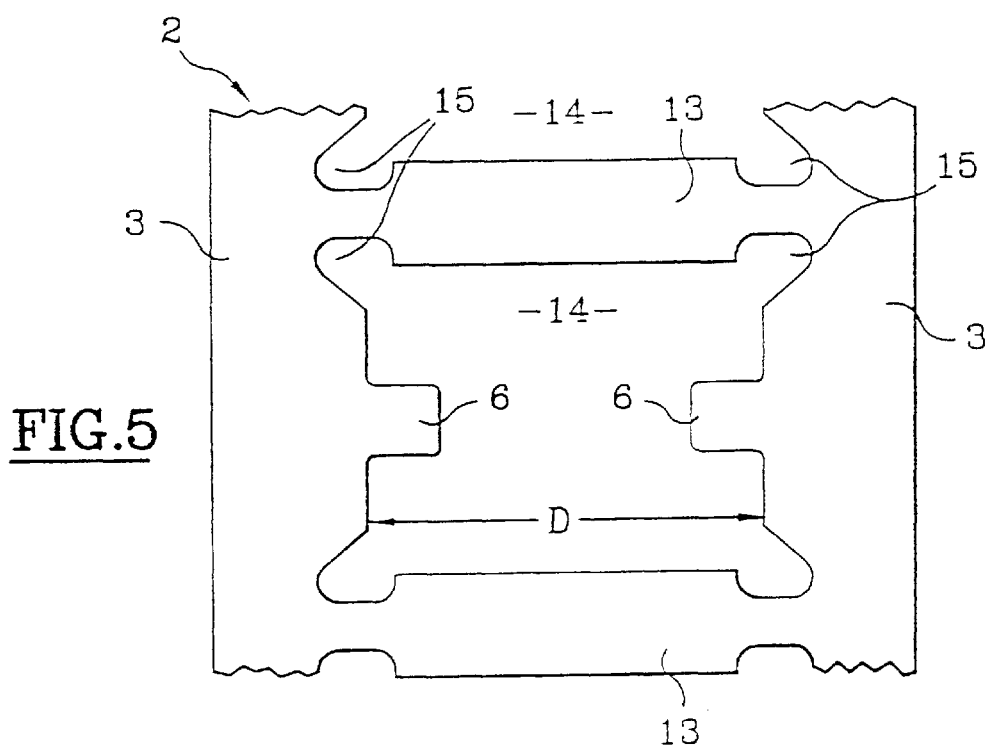
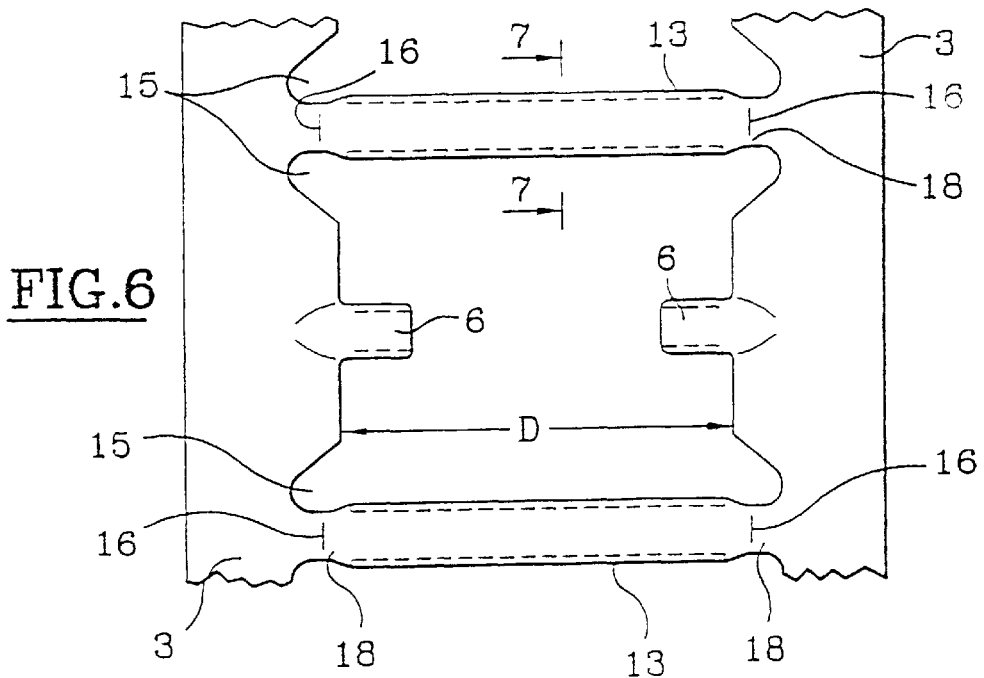
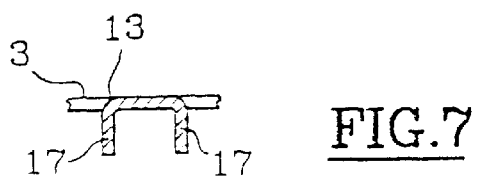

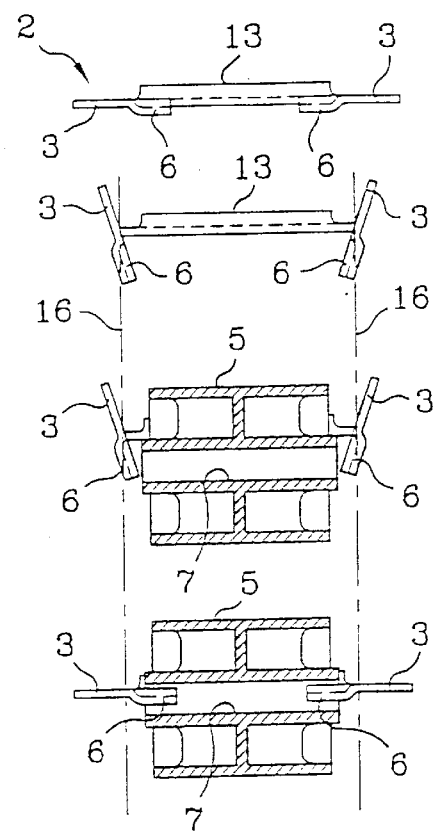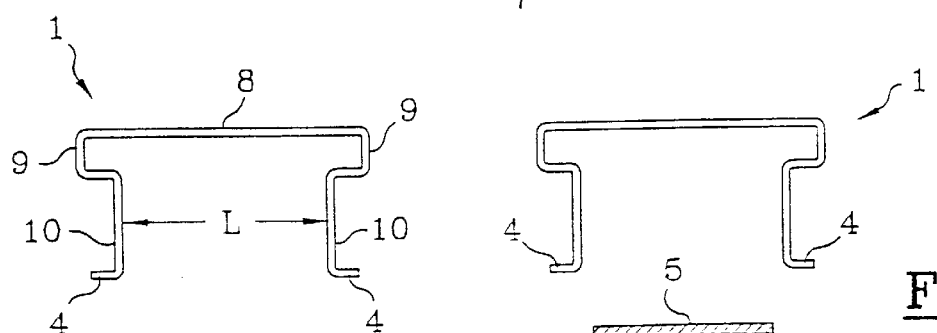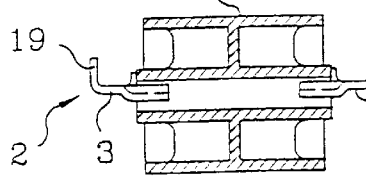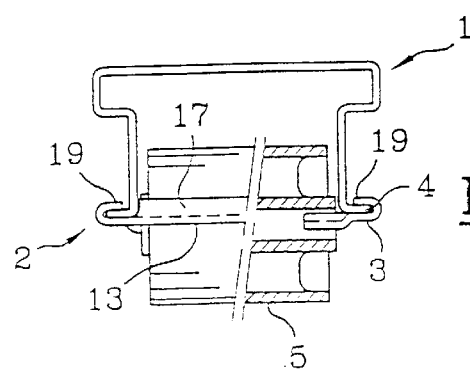

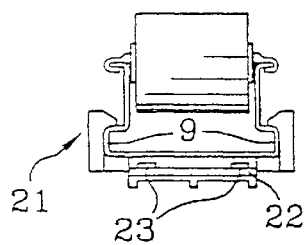
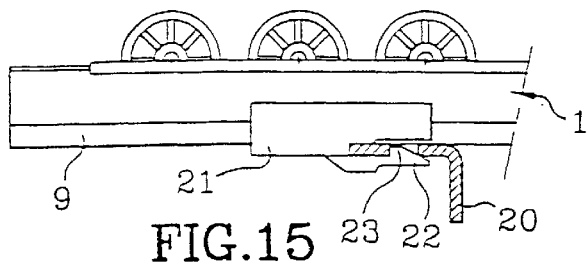
FIG.16
FIG.15
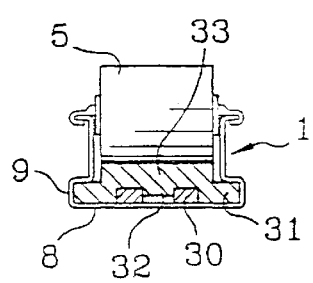
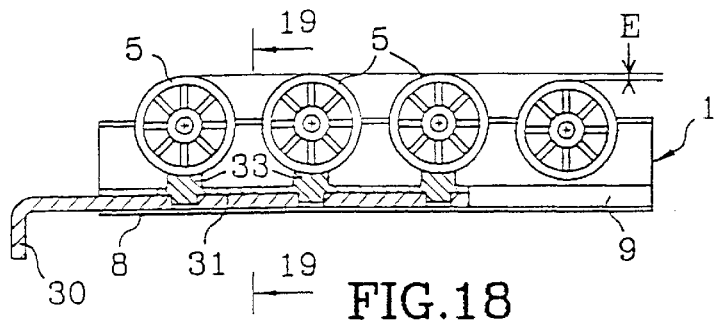
FIG.19
FIG.18
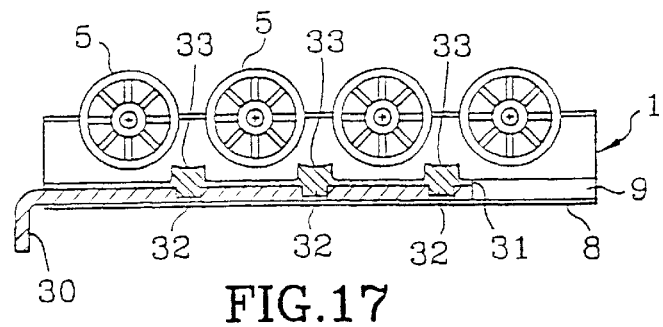
FIG.17
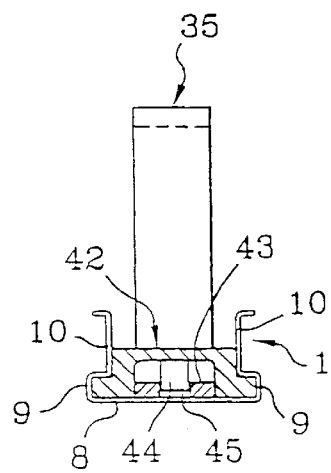
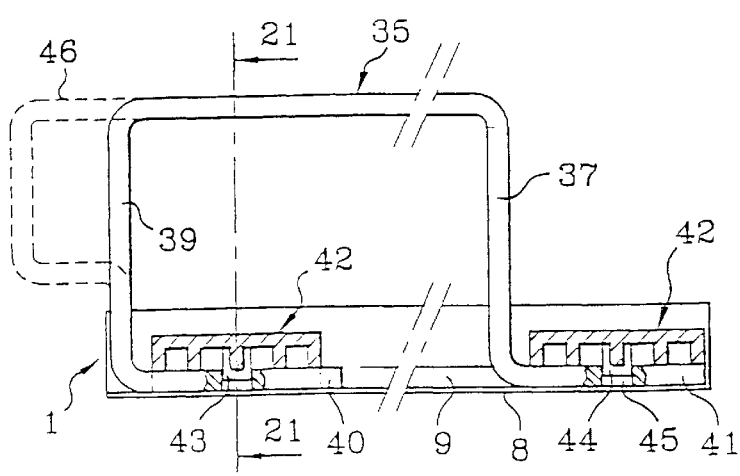
FIG.21
FIG.20

RAIL WITH ROLLERS AND PROCESS OF MANUFACTURE

CROSS-REFERENCE TO RELATED APPLICATIONS

The present application claims priority under 35 U.S.C. § 119 of French Patent Application No. 96 14838, filed Nov. 28, 1996.

BACKGROUND OF THE INVENTION

1. Field of the Invention

The present invention relates to a roller rail used in the field of dynamic layer storage for preparing orders or supplying workstations.

2. Discussion of Background Information

These roller rails are often composed of a profile made of sheet metal whose section is U-shaped or omega-shaped, open at the upper end and whose rims are arranged in order to accommodate the axles of the rollers, as described for example in U.S. Pat. No. 3,586,142.

Another type of rail, described in FR-A-2 563 506, comprises a sheet metal profiled rail and a plastic material strip which separates and maintains the rollers on the rail. This plastic strip also improves the resistance properties of the rail while preventing its opening to a certain extent when carrying heavy loads.

There are also rails using a U-shaped sheet metal profile, but open downwardly. The bottom of the U has been drilled to accommodate the rollers. This type of rail, described notably in U.S. Pat. No. 4,186,830, also comprises axles formed directly into the profile flanges. This type of rail is particularly economical and moreover it can be produced directly by profiling a sheet metal band, embossed in a previous stage.

However, this type of rail cannot contain a high density of rollers since a minimum quantity of matter must be preserved between the rollers so as not to make it brittle.

The present invention offers a rail structure similar to that described in the previously mentioned document FR-A-2 563 506. It advantageously offers still higher resistance and reduces the production cost significantly.

SUMMARY OF THE INVENTION

The rail according to the invention consists of the association of a lower profile whose section is U-shaped or omega-shaped and of an upper profile consisting of a steel band, for example, cut and embossed, used as a roller carrier, which band comprises edges which are folded and crimped on the rims of the lower profile, which edges are linked by crossbeams between which the rollers are positioned.

According to one embodiment of the invention, the sheet metal band making up the upper profile comprises axles which are produced by a direct cutting and embossing process and which are associated with the edges. Besides, the length of the crossbeams linking the edges is greater than the width of the rollers and their width is relatively small in order to facilitate folding and tilting the edges practically at right angle with respect to the crossbeams, to enable integrating the rollers between the axles, whereby the axles can be inserted into the hubs of the rollers and lock the rollers after flattening the edges in the plane of the crossbeams.

According to another embodiment of the invention, the crossbeams of the upper profile are U-shaped lengthwise in order, to confer to them a certain rigidity and to delineate accurately at their ends, the area where the edge is folded with respect to the crossbeam, thereby setting a distance between the folding zones which is vastly greater than the width of the rollers. Secondly, this will create and maintain maintain an accurate distance between the lateral walls of the lower profile when crimping the edges of the upper profile onto the rims of the lower profile.

According to another embodiment of the invention, the section of the axle portions of the rollers looks like an inverted U, which section is inscribed within a circle whose diameter is smaller than that of the hub of the rollers. The height of the axle portions is more or less equal to the radius of the hub and their useful length is in the same order of magnitude as the internal diameter of the hub of the rollers.

According to another embodiment of the invention, the lower portion of the lower profile comprises bulges, protruding on either side of the bottom, which bulges improve notably the torsion inertia of the rail and constitute a kind of multi-purpose slide for clipping or snapping the rail on a frame, as well as installing accessories such as, for instance a braking system used as a separator, accommodated inside the profile, between the bottom and the rollers, guided inside the bulges or still by using the lower profile only, mounting a guiding structure inserted between the rails.

The invention also relates to the rail production process. This process consists in preparing, by folding or profiling operations, from a sheet metal band, a U-shaped or omega-shaped lower profile and an upper profile used as a support to the rollers, whereas the assembly is produced by folding and crimping the edges of the band onto the rims of the lower profile.

According to a preferred embodiment of the invention, the process consists: in preparing in advance the sheet metal band upper profile, by cutting, embossing and forming operations, in order to produce roller axles directly and, in installing the rollers while folding the edges at right angle with respect to the crossbeams in order to spread the axles apart and to enable inserting and integrating the rollers and especially the hub of each roller opposite to the axles then: in repositioning the edges flat in the plane of the band and of the crossbeams, which causes the axles to be inserted into the hub of the rollers, thereby locking the rollers.

BRIEF DESCRIPTION OF THE DRAWINGS

The invention will be described in detail using the following description and the appended drawings given for exemplification purposes and in which:

FIG. 1 represents, in perspective, a rail portion according to the invention;

FIGS. 2 and 3 show a portion of the edges with a roller axle, in perspective;

FIG. 4 is a cross section of the roller rail, on the one hand at one of the roller axles and, on the other, between an axle and a crossbeam;

FIG. 5 represents, seen from above, a portion of the cut sheet metal band which makes up the upper profile, before notably embossing the axles that are used as a prop for the rollers and the crossbeams;

FIG. 6 represents the sheet metal band of FIG. 5 after embossing the axles and the crossbeams;

FIG. 7 is a cross section along 7—7 of FIG. 6 at a crossbeam;

FIGS. 8 to 14 illustrate the various manufacture stages of a rail;

FIG. 15 represents a side view of a rail fitted with a snap or clip for fastening onto a frame;

FIG. 16 is a front view of FIG. 15;

FIG. 17 represents a rail top view, as a longitudinal section, fitted with a roller braking system, represented in inactive position;

FIG. 18 represents the rail of FIG. 17 with the braking system in active position on three rollers;

FIG. 19 is a section along line 19—19 of FIG. 18;

FIG. 20 is a top view section showing the lower profile of a rail, fitted with a guiding structure; and FIG. 21 is a section of FIG. 20.

DETAILED DESCRIPTION OF THE PREFERRED INVENTION

The rail according to the invention, such as represented on FIG. 1, comprises 3 three elements:—a U-shaped or omega-shaped lower profile 1, comprising the substructure beam,—an upper profile 2 resting on the profile 1 and whose rims or edges 3 are folded and crimped on the rims 4 of the profile 1,—rollers 5, regularly spaced, carried by the profile 2 and especially by axles 6 that are formed directly and are part of the profile 2, as a single block as illustrated in FIGS. 2 and 3. These axle portions 6 are integrated into the hub 7 of the rollers 5, which hub has the shape of a tube.

The profile 1 is made of a steel sheet band, formed according to a folding or embossing process.

The profile 2 is, in the same way, also prepared out of a steel band, which has been cut and embossed in order to accommodate the various rollers 5. The edges 3 of this sheet metal band are then folded and profiled to be assembled with the profile 1 as described below.

FIG. 4 shows a top view of the rail, as a transversal section.

The profile 1 comprises a bottom 8, lateral bulges 9 and, above these bulges, lateral walls 10 perpendicular to the said bottom 8 and whose upper part is made of the rims 4; these rims 4 are folded at right angle with respect to the lateral walls 10 and they extend to the outside.

The profile 2 rests on the profile 1 and especially on the rims 4 and its edges 3 are folded and crimped on the said rims. It can be noted that the width of the rail at the bulges 9 corresponds more or less to the width of the rail at the profile 2 and especially of the edges 3.

The profile 2 also comprises the axles 6 that extend to the inside of the rail over a useful length, which corresponds more or less to the diameter of the hub 7 of the roller 5.

The roller 5 rests on the upper rounding 11 of the axles 6. It can be noted in FIG. 2 that the axle 6 looks like an inverted U. The section of these axles 6 is inscribed within a circle. The diameter of the circle surrounding this axle is marginally smaller than the diameter of the bore of the hub 7 so that the lower ridges 12 of the axle 6 do not touch the hub 7 of the roller 5. The height of the axles 6 is even slightly smaller than the radius of the hub 7.

The axles 6 are embossed and protrude above the upper plane of the edges 3.

The rollers 5 are made conventionally of a plastic material such as polyamide.

As can be seen on the left portion of FIG. 4, a portion of the crossbeam 13 extends between both edges 3 of the upper profile 2. This crossbeam 13 whose section looks like an inverted U enables calibration of the internal width L of the lower profile 1, which width is slightly greater than the total length of the hub 7 of the rollers 5. This crossbeam 13 enables setting the lateral walls 10 when crimping the edges 3 of the upper profile 2 on the borders 4 of the lower profile 1.

FIG. 5 shows the sheet metal band, which constitutes the profile 2, after the cutting operation. This sheet metal band is cut, thus exposing the edges 3, the crossbeams 13 as well as windows 14 in which the rollers 5 are accommodated. The windows 14 have a width D, taken between the edges 3, which is greater than that of the hubs 7 of the rollers 5 and especially greater than the width L between the lateral walls 10 of the lower profile 1 in order to prevent any friction of the rollers on the rims of the window.

In the windows 14, starting from the edges 3, the axles 6 are embossed as illustrated in FIG. 6, to obtain the shape illustrated in FIGS. 2 and 3.

The edges 3 are then linked together using the crossbeams 13. These crossbeams separate consecutive rollers 5. They consist of a sheet metal band whose length is vastly greater than the width of the rollers 5. The crossbeams can extend as far as into the edges 3 through cut-outs 15 whose depth ranges between 2 and 4 mm. This arrangement enables folding the edges 3 with respect to the crossbeams 13 around a line defined by the segment 16, which is situated in a zone at the end of the crossbeams 13.

FIG. 6 represents the portion of sheet metal band of FIG. 5 after embossing. This embossing enables forming the axles in causing them to protrude above the plane of the upper profile 2; it also enables forming the crossbeams 13 to confer them a certain resistance.

These crossbeams 13 are embossed longitudinally to form a U-shaped rigid beam whose sides 17 extend downwardly as shown in FIG. 7. The height of the sides 17 is in the order of a few millimeters, sufficient to be used as a spacer, as represented in FIG. 4, for the lateral walls 10 of the lower profile 1.

The zone 18 situated at each end of the crossbeams 13 corresponds to the folding area mentioned previously and which will be detailed in connection with FIGS. 10 to 12.

It is in this zone 18 that the folding line 16 is situated and it is the presence of this zone that facilitates folding the edges 3 with respect to the crossbeams 13. The crossbeams 13, strengthened by their U-shaped section, rest indeed perfectly rectilinear.

FIG. 8 represents the lower profile 1 on its own, in reverted position such as shown after forming with a view to integration into the assembly line of the rail as represented in FIGS. 9 to 14.

The bottom 8, whose width is greater than the space L, is located between the lateral walls 10 in order to form the bulges 9. The section of these bulges 9 is more or less square and they protrude with respect to the lateral walls 10.

The rims 4 are on a plane parallel to that of the bottom 8. They are perpendicular to the lateral walls 10 and extend to the outside from the walls.

The sheet metal band that constitutes the profile 2 is represented as a front view and turned upside down in FIG. 9. The U-shaped axles 6 are oriented with their aperture turned upwardly. The crossbeam 13, also exhibiting a U-shape, is open upwardly.

FIG. 10 shows the folding of the band forming the profile and especially the tilting of the edges 3, around the folding lines 16, i.e. at the areas 18 that are situated at the ends of the crossbeams 13. This folding enables spreading the axles 6 apart in order to insert between the axles as shown in FIG. 11, the rollers 5 while having their hub 7 opposite to the said axles. As shown in FIG. 12, the sheet metal band and especially the edges 3 are then flattened, repositioned on the plane of the crossbeams 13 which causes the rollers 5 to be locked by placing and aligning the axles 6 in the hub 7.

Assembling the profile 2 onto the profile 1 to build the roller rail consists first of all in folding the ends of the edges 3 at right angle. The pleats 19 thus provided and the ends of the sides 17 of the crossbeams 13 form a recess in which the rims 4 of the profile 1 can be integrated.

These rims 4 rest on the internal section of the edges 3. Then, as shown in FIG. 14, the pleats 19 of the edges 3 are closed on the rims 4 and crimped or stapled; this provides a high inertia, particularly heavy-duty rail.

FIGS. 15 and 16 show the installation of a rail on the crossbeam 20 of a frame. This installation resorts to clips 21, for instance, which enable snapping the rail on the crossbeams 20. These clips, made of plastic or other material, are of a shape complementary to that of the lower section of the profile 1. The lateral bulges 9 located at the lower section of the profile 12 build up a kind of slide on which the clips 21 are snapped.

These clips 21 comprise an elastic tongue 22, for example fitted with at least one snug 23, which snug co-operates with an appropriate orifice provided in the crossbeam 20.

FIGS. 17 to 19 show a particular assembly for this kind of rail which enables locking three rollers while causing them to protrude in order to constitute a partition.

This system comprises two elements:—a pull cord 30 resting on the bottom 8 of the profile 1 and a block 31 of appropriate material such as rubber, with the shape of a rectangular plate guided inside the profile 1 and especially in the lateral bulges 9. This plate 31 contains a center groove to cover the pull cord 30 and the snugs 32 that connect the plate to the pull cord 30.

These snugs 32 are placed under the pads 33 for example the pads extend above the plate 31 and have a shape appropriate to co-operate with the rollers 5. Each of these pads 33, represented as three in number the figure, corresponds to a roller 5 and, in the active position, as seen represented in FIG. 18, they are situated below the rollers 5, which rollers are more or less elevated with respect to the rollers 5 which have remained free, raised by a distance E, approx. 2 mm for instance.

This distance enables the braked rollers to protrude with respect to the other rollers of the rail and of the belt. These few braked rollers are sufficient to slow down packages or parcels circulating on the belt in a dynamic store, for example.

FIGS. 20 and 21 show the lower profile 1 only, to which a guiding structure or partition is connected, liable to be inserted into a belt of complete rails, either between two rails or even along a belt. This structure consists for instance of a flat 35, folded suitably to form a guide using its branch 36 protruding above the profile 1 between the ends 37 and 39.

The ends 37 and 39 of the guide, perpendicular to the branch 36, comprise pleats 40 and 41 respectively, at right angle, resting on the bottom 8 of the profile 1. These pleats are locked using wedges 42 engaging into the bulges 9 of the profile 1 and extending between the lateral walls 10.

The width of the flat 35 and its pleats 40 and 41 is vastly smaller than the distance L separating the lateral walls 10 from the profile 1. The pleats are accommodated and locked in a groove 43 provided in the centre portion of the wedges 42.

These wedges 42 are integral with the pleats 40 and 41 via a snug 44 arranged at the centre and protruding downwards in the groove 43; this snug is located in an orifice 45 provided in the pleats 40 and 41.

These guiding structures are inserted into a profile 1, which profile is fixed on the frame like the other roller rails, using snaps or clips 21.

The form of these guiding structures is moreover readily adjustable to the restraints imposed by the belts of roller rails, since it suffices to fold to the flat 35 according to the requirements in order to constitute, as represented as a thin dotted line, a protrusion 46 for instance to serve as a guide at the inlet section of a belt.

What is claimed is:

1. A roller rail comprising:
    a lower profile whose section is one of, U-shaped or omega-shaped;
    a plurality of rollers; and
    an upper profile made of a steel band, cut and embossed, used as a roller carrier, which band comprises edges which are folded and crimped on upper rims of said lower profile, which edges are linked together by crossbeams between which said rollers are positioned.

2. The roller rail according to claim 1, wherein the upper profile comprises axles which are produced by a direct cutting and embossing process of the steel band.

3. The roller rail according to claim 2, wherein the crossbeams have a given length and the rollers have edges and a given width, and wherein the length of the crossbeams is slightly greater than the width of the rollers between the edges and in that their width at the edges is relatively small in order to facilitate tilting the edges with respect to the ends of said crossbeams due to a folding operation, at approximately a right angle, to enable integrating said rollers between the axles, whereby said axles can be inserted into a hub of said rollers by flattening the edges in the plane of said crossbeams.

4. The roller rail according to claim 3, wherein the crossbeams comprise U-shaped beams, which beams serve as spacers between lateral walls of the lower profile to accurately locate the folding zones of the edges at the end of the said crossbeams.

5. The roller rail according to claim 3, wherein a section of the axles is of inverted U-shape, which section is inscribed within a circle whose diameter is smaller than that of the hub of the rollers, the height of said section being slightly smaller than the radius of said hub and its length being of the same order of magnitude as the internal diameter of the hub of said rollers.

6. The roller rail according to claim 1, wherein the lower profile comprises:
    a lower section;
    a bottom; and
    bulges protruding on either side of the bottom to form a multi-purpose slide.

7. The roller rail according to claim 6, further comprising:
    clips;
    a flexible tongue on said clips;
    a snug on said tongue;
    a frame;
    a crossbeam on said frame;
    an orifice in said crossbeam;
    said bulges, in co-operation with the clips fitted with said flexible tongue fastening said rail on the crossbeam of the frame while locking said snug of the tongue in the orifice of said crossbeam.

8. The roller rail according to claim 6, further comprising inside the lower profile:
    a roller braking system comprising a pull cord resting on the bottom of said lower profile; and
    a block comprising a plate guided in the bulges of said lower profile, said plate being connected to said pull cord and containing pads which co-operate by moving the pull cord with an underside of said rollers in order to stop them and thus to form a separating device.

9. The roller rail according to claim 6, further comprising a guiding structure in the form of a flat fastened only to said lower profile by wedges inserted in the bulges of said lower profile.

10. The roller rail according to claim 1, wherein said lower profile comprises:

a bottom; and lateral walls whose upper portion comprise rims folded at a substantially right angle towards the exterior.

11. The roller rail according to claim 1, wherein the upper profile serves as a carrier for a plurality of rollers and has axles integrated into a hub of the rollers.

12. The roller rail according to claim 1, further comprising:

a bottom on said lower profile;

lateral walls on said lower profile, whose upper portion comprise rims folded at a substantially right angle towards the exterior; and the upper profile serving as a carrier for a plurality of rollers and having axles integrated into a hub of the rollers.

13. A process of manufacture of a roller rail comprising:

preparing by, one of, folding or profiling operations, a sheet metal band, a lower profile with one of, U-shaped or omega-shaped section, and an upper profile carrying a plurality of rollers; and assembling said profiles together by folding and crimping the edges of the sheet metal band constituting said upper profile onto upper rims of said lower profile.

14. The process according to claim 13, further comprising, prior to assembling the lower and upper profiles:

preparing said upper profile, by cutting, embossing and forming operations, in order to provide axles directly on the rollers; and mounting said rollers while folding edges thereon with respect to crossbeams in order to spread axles apart and enable integration of the rollers between the axles, which axles then engage into hubs of the rollers when flattening the edges, in the plane of said crossbeams, thereby locking the rollers.

* * * * *